United States Patent [19]
Horikawa

[11] Patent Number: 4,733,062
[45] Date of Patent: Mar. 22, 1988

[54] FOCUS DETECTING DEVICE

[75] Inventor: Yoshiaki Horikawa, Hachiouji, Japan

[73] Assignee: Olympus Optical Co., Ltd., Tokyo, Japan

[21] Appl. No.: 27,048

[22] Filed: Mar. 23, 1987

Related U.S. Application Data

[63] Continuation of Ser. No. 638,718, Aug. 8, 1984, abandoned.

[30] Foreign Application Priority Data

Aug. 18, 1983 [JP] Japan .................................. 58-150741

[51] Int. Cl.⁴ .............................................. G01J 1/20
[52] U.S. Cl. ...................................... 250/201; 354/403
[58] Field of Search ...................... 250/201, 204; 356/1, 356/4; 354/403

[56] References Cited

U.S. PATENT DOCUMENTS

| | | | |
|---|---|---|---|
| 3,836,919 | 9/1974 | Matsumoto et al. ................ | 354/403 |
| 4,427,880 | 1/1984 | Kanade et al. ........................... | 356/4 |
| 4,441,810 | 4/1984 | Momose et al. ..................... | 354/403 |
| 4,445,029 | 4/1984 | Nagaoka et al. ..................... | 250/201 |
| 4,501,961 | 2/1985 | Stauffer ................................ | 250/204 |
| 4,541,702 | 9/1985 | Momose et al. ..................... | 354/403 |
| 4,542,971 | 9/1985 | Numata ............................... | 354/403 |
| 4,543,476 | 9/1985 | Horikawa ............................ | 250/201 |

Primary Examiner—David C. Nelms
Attorney, Agent, or Firm—Cushman, Darby & Cushman

[57] ABSTRACT

A focus detecting device comprising a light source means alternately producing a pair of light beams directed to the surface of an object, a light receiving element arranged on an image surface and detecting the image positions of the pair of light beams reflected on the object surface and a signal processing means detecting the displacements of the image positions of the pair of light beams with signals from the light receiving element, in order to simplify the formation of the entire device and to be able to quickly focus even a dark object.

8 Claims, 13 Drawing Figures

FOCUS DETECTING DEVICE

This is a continuation of application Ser. No. 638,718, filed Aug. 8, 1984, which was abandoned upon the filing hereof.

BACKGROUND OF THE INVENTION (a) Field of the Invention

This invention relates to focus detecting devices adapted to such optical instruments as cameras, microscopes, hard endoscopes and retinal cameras and medical instruments, and more particularly to a focus detecting device wherein the position of the object image is displaced by using light beams passing through different courses in an optical system so as to thereby detect the position of a focus.

(b) Description of the Prior Art

There are various focus detecting devices of this kind. For example, in a system of producing a phase difference of an image by dividing the pupil as mentioned in U.S. Pat. appln. Ser. Nos. 372,374, U.S. Pat. No. 4,521,108; 511,206 now abandoned; 582,734, now abandoned and 582,736, now U.S. Pat. No. 4,633,073 it has been necessary to provide a mechanical means for dividing the pupil and such electric means as a liquid crystal near the pupil position in the optical system and therefore there has been a problem that the optical system is complicated. Also, in a system of seeing a part of the pupil with a lens in order to avoid arranging the pupil dividing means in the optical system as mentioned in Japanese Patent laid-open No. 126221/1980, a plurality of light receiving elements detecting the displacement of the image are required and there has been a problem that the adjustment is difficult. Further, in a system wherein a small lens is arranged on the image surface and a combination of elements for seeing different parts of the pupil is provided for each picture element as mentioned in Japanese Patent laid-open No. 130506/1980, its own complicated light receiving element is required and there has been a problem that the signal processing system is complicated. In the above mentioned systems utilizing the light from the object, there has been a problem that, in case the object is dark, it will be impossible to detect a focus. On the other hand, a system of projecting a light toward an object is suggested but is a range finder system and therefore is not adapted to single lens reflex cameras and microscopes which are preferably of the TTL system.

SUMMARY OF THE INVENTION

A primary object of the present invention is to provide a focus detecting device which is simple to form into an optical system and signal processing system and is easy to adjust.

According to the present invention, this object is attained by providing a light source means able to alternately produce a pair of light beams directed to an object surface through different courses, a light receiving element arranged on an image surface in an image forming position to detect the positions of the images of the pair of light beams reflected on the object surface and a signal processing means detecting the displacements of the positions of the images of the pair of light beams with output signals from the light receiving element.

According to a preferred formation of the present invention, the light source means comprises a pair of light emitting elements, light collecting lenses arranged respectively in front of the respective light emitting elements and a first beam splitter for directing a pair of light beams formed by the light collecting lenses to an object surface through an objective and a semiconductor light position detector is used as a light receiving element. Thereby, signals are put into the signal processing circuit for the real time and, as a result, the focusing speed will increase.

According to another preferred formation of the present invention, a pair of light beams reflected by a first beam splitter are directed to an object surface through another second beam splitter provided in a part of a quick-return mirror and an image photographing lens. Thereby, the focus detecting device can be easily built-in within a camera body.

According to further another preferred formation of the present invention, a pair of light beams having passed through a first beam splitter are directed to an object surface through a second beam splitter arranged on the optical axis of an objective and the objective. Thereby, the focus detecting device can be simply incorporated within an epi-microscope.

This and other object of the present invention will become more apparent during the course of the following detailed description and appended claims.

DESCRIPTION OF THE PREFERRED EMBODIMENT

Figure 1:
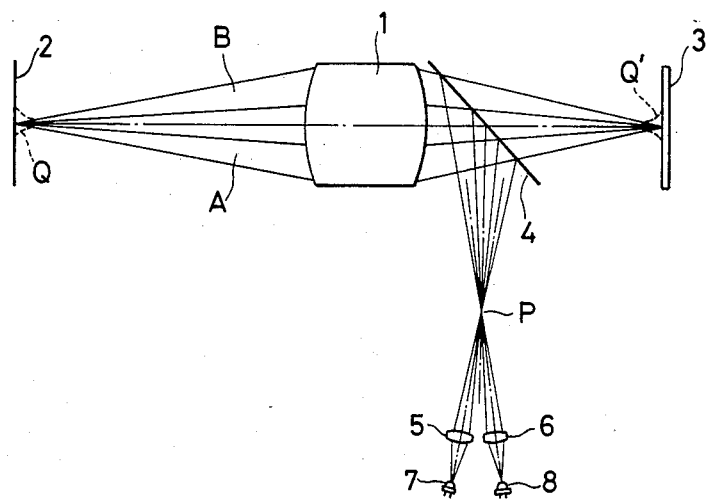
FIGS. 1 and 2 are views for explaining the basic principle of a focus detecting device according to the present invention.

First of all, the basic principle of a focus detecting device according to the present invention shall be explained with reference to FIGS. 1 and 2. A light beam coming out of a light emitting element 7 passes through a micro-lens 5, and is then collected in a position P conjugate with an image surface of an image photographing lens 1, is reflected by a beam splitter 4 and becomes a light beam A by the action of an image photographing lens (objective) 1 to be formed as a spot image Q on an object 2 located in an in-focus position. In case the object 2 is an object dispersing the light, the spot image Q will become a light beam filling the aperture of the image photographing lens 1 and will be formed as a spot image Q' on a light receiving element 3. In case the object 2 is a mirror surface, the spot image Q will become a light beam B and will be formed as the spot image Q' on the light receiving element 3. On the other hand, the light beam coming out of the light emitting element 8 also passes through a micro-lens 6 and to be formed as the spot image Q' on the light receiving element 3 in the same manner (see the light beam B). Therefore, in the case of an in-focus state, the spot image by the light emitting element 7 and the spot image by the light emitting element 8 will be found to be the perfectly coincident identical spot image on the light receiving element 3.

Figure 2:
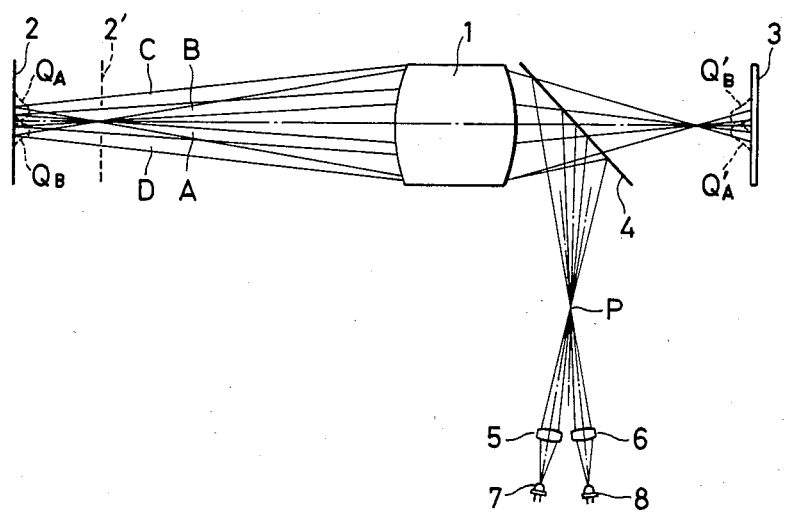

On the other hand, FIG. 2 shows an out-of-focus state. The light beam coming out of the light emitting element 7 passes through the micro-lens 5, through the position P conjugate with the image surface of the image photographing lens 1, and is reflected by the beam splitter 4 to become a light beam A from the image photographing lens (objective) 1. This image is formed as an out-of-focus spot image $Q_A$ on the object 2 not in an in-focus position. The in-focus position is shown by 2'. In case the object 2 is an object dispersing the light, the spot image $Q_A$ will become a light beam equal to the aperture of the image photographing lens 1, will pass through the beam splitter and will be formed as an out-of-focus spot image $Q'_A$ on the light receiving element 3. In case the object 2 is a mirror surface, the spot image $Q_A$ will become a light beam C and will be formed as an out-of-focus spot image $Q'_A$ on the light receiving element 3. On the other hand, the light beam coming out of the light emitting element 8 will also pass through the micro-lens 6, will then be formed as an out-of-focus spot image $Q_B$ on the object 2 in the same manner and then will be formed as an out-of-focus spot image $Q'_B$ on the light receiving element 3 (see light beams B and D). Thus, when out-of-focus, the spot images $Q'_A$ and $Q'_B$ of the light emitting elements 7 and 8 on the light receiving element 3 will be formed in different positions.

Therefore, if the light emitting elements 7 and 8 are alternately flickered, when in-focus, the position of the spot image on the light receiving element 3 will not vary. However, when out-of-focus, the spot image on the light receiving element 3 will alternately become $Q'_A$ and $Q'_B$ and the position thereof will vary. Therefore, in the case of focusing, the image photographing lens 1 (the object 2 in the case of a microscope) may be moved so that the spot image on the light receiving element 3 may not move.

It is possible from the moving direction and displacement of the spot image to judge whether the image forming position is in front or rear of the normal position and to measure the defocus amount. Particularly, in case the defocus amount is small, if the angle formed by the light beams from the light emitting elements 7 and 8 is $\theta$ and the displacement of the spot image is $\delta$, the defocus amount d on the image side will be able to be determined from the following formula:

$$d = \frac{\delta}{2 \tan \frac{\theta}{2}} \quad (1)$$

By the way, the above is of the case that the light source image to be formed is a spot image. However, it need not always be a spot image.

Figure 3:
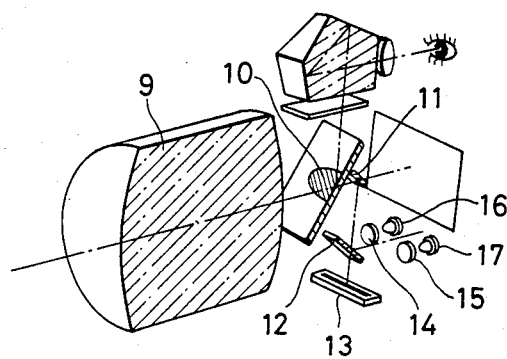
FIG. 3 is an explanatory view showing an optical system of an embodiment of a focus detecting device according to the present invention.

Now, the case that the above mentioned principle is applied to a single lens reflex camera shall be explained with reference to FIGS. 3 to 7. FIG. 3 shows an optical system. The reference numeral 9 denotes an image photographing lens, 10 denotes a beam splitter provided in a quick return mirror, 11 denotes a mirror, 12 denotes a beam splitter, 13 denotes a light receiving element, 14 and 15 denote micro-lenses and 16 and 17 denote light emitting elements. As in the above, the same optical system as in FIG. 1 is set in a camera. In this case, a semiconductor light position detector utilizing a lateral photo effect is used for the light receiving element 13.

Figure 4:
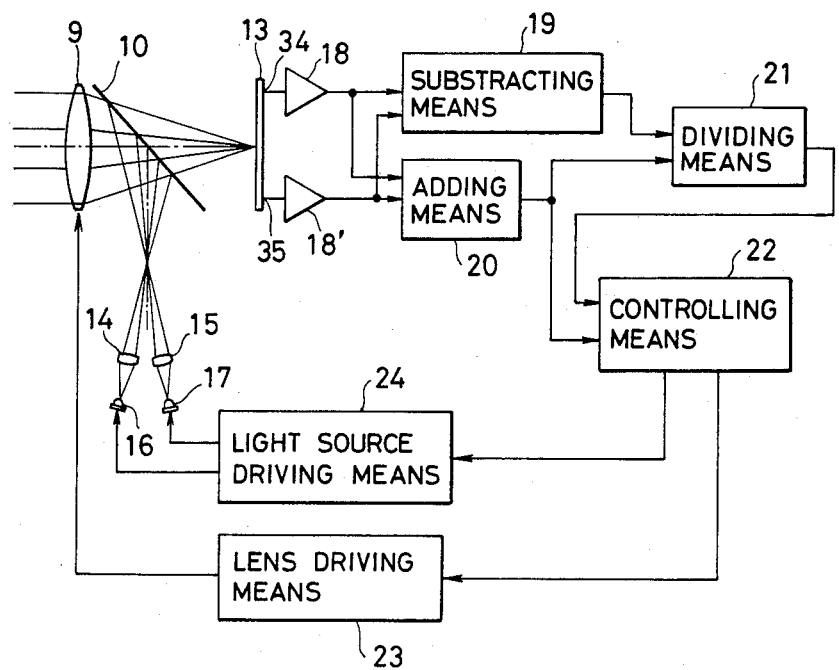
FIG. 4 is a block diagram showing a signal processing circuit part of a focus detecting device according to the present invention.
Figure 5:
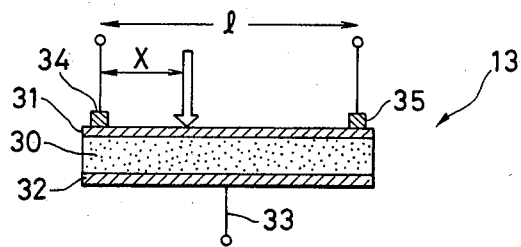
FIG. 5 is an explanatory view showing the formation of a light receiving element.
Figure 6:
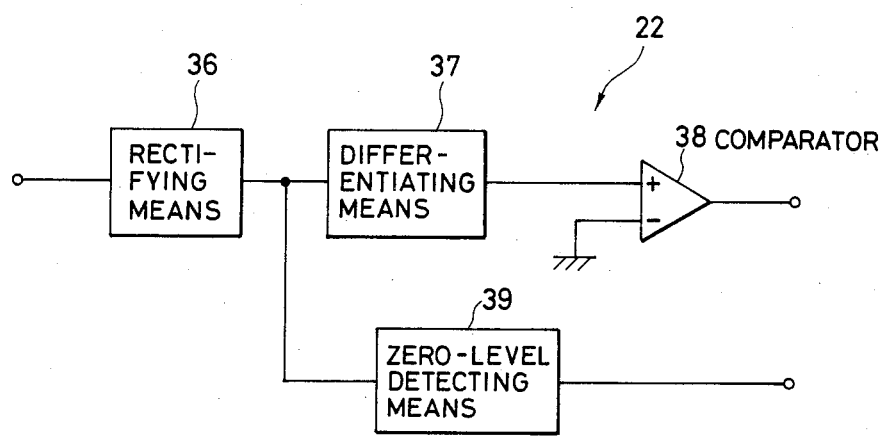
FIG. 6 is a block diagram showing the details of a controlling means part in the signal processing means shown in FIG. 4.

FIG. 4 shows a signal processing circuit. First of all, the detailed structure of the light receiving element 13 shall be explained with FIG. 5. The reference numeral 30 denotes a silicon base plate having a high resistance, 31 denotes a p-type resistance layer, 32 denotes an n+ layer, 33 denotes a common electrode and 34 and 35 denote electrodes. The surface layer is so made as to develop a photoelectric potential by a p-n junction. Therefore, when a light is incident on the p-type resistance layer 31 as illustrated, output currents $I_A$ and $I_B$ will be obtained respectively from the electrodes 34 and 35 in response to the incident position. Here, if the distance between the electrodes 34 and 35 is l, the resistance is Rl, further the distance from the electrode 34 to the incident position of the light is x, its partial resistance is Rx and the photoelectric current generated by the incident light $I_O$, $$I_A = \frac{Rl - Rx}{Rl} \cdot I_O, \quad I_B = \frac{Rx}{Rl} \cdot I_O \quad (2)$$

If the resistance layer is uniform, the following formulas will be obtained:

$$I_A = \frac{l - x}{l} \cdot I_O, \quad I_B = \frac{x}{l} \cdot I_O \quad (3)$$

Therefore, by calculating $$\frac{I_A - I_B}{I_A + I_B} = \frac{l - 2x}{l} \quad (4)$$

from the output currents $I_A$ and $I_B$ of the electrodes 34 and 35, the incident position of the light, that is, the distance x will be determined irrespective of the incident energy, that is, the incident light amount. By the way, the incident light amount is determined from the following formula:

$$I_O = I_A + I_B \quad (5)$$

Returning to FIG. 4, the reference numerals 18 and 18' denote current amplifiers for amplifying the output currents $I_A$ and $I_B$ from the two electrodes 34 and 35 of the light receiving element 13 and the outputs will be $V_A$ and $V_B$. The reference numeral 19 denotes a subtracting means for calculating $(V_A - V_B)$, 21 denotes a dividing means for calculating $(V_A - V_B)/(V_A + V_B)$ (corresponding to the formula (4)), 22 denotes a controlling means for removing the direct current bias component from the output signal of the dividing means 21 and then controlling a lens driving means 23 in response to the output signal and its details are as shown for example, in FIG. 6. That is to say, the reference numeral 36 denotes a rectifying means, 37 denotes a differentiating means, 38 denotes a comparator and 39 denotes a zero level detecting means. The alternating current output signal from the dividing means 21 will be converted to a direct current signal by the rectifying means 36, whether it is positive or negative will be judged by the comparator 38 through the differentiating means 37 and whether the above mentioned signal is decreasing or increasing will be judged. In case it is increasing, the lens driving direction will be reversed. When the zero level detecting means 39 detects that said signal has become zero, an in-focus state will be detected and the operation of the lens driving means 23 will be stopped. Light source driving means 24 is a structure for alternately flickering the light emitting elements 16 and 17.

Figure 7A:
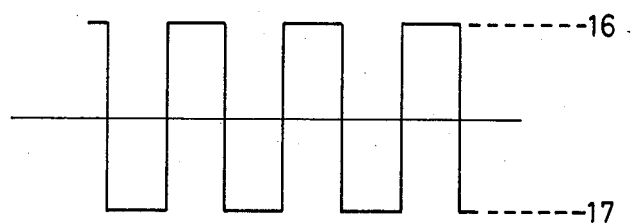
FIGS. 7A, 7B, 7C, 7D and 7E are views for explaining processes for processing signals from the light receiving element.
Figure 7B:
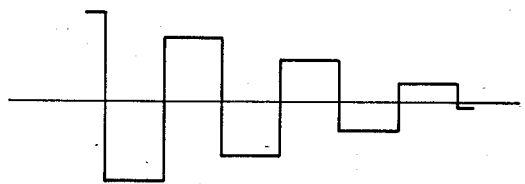
Figure 7C:
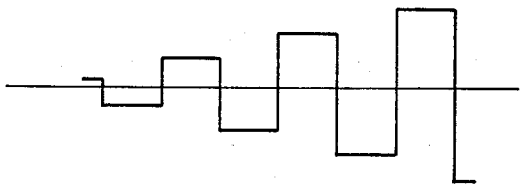
Figure 7D:
Figure 7E:
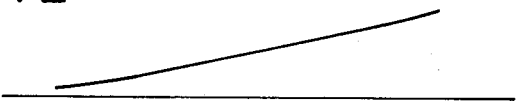

As the present focus detecting device is formed as described above, when the image photographing lens 9 is placed in a fixed position and the light sources 16 and 17 are alternately caused to emit lights by the light source driving means 24 in an out-of-focus state, a signal of such fixed amplitude as is shown, for example, in FIG. 7A will be output from the dividing means 21. Here, the amplitude of this signal will be a standard of the displacement from the in-focus point and, if the amplitude=0, it will mean an in-focus state. Therefore, if the image photographing lens 9 is slightly moved along the optical axis, the output signal of the dividing means 21 will vary as shown in FIG. 7B or 7C. If this signal is rectified to be smooth by the rectifying means 36, it will vary to be such signal as is shown in FIG. 7D or 7E. Therefore, if it is differentiated by the differentiating means 37, the gradient of the envelope of the signal variation will be obtained. If this gradient is negative, the lens 9 will be approaching the in-focus point. If it is positive, the lens 9 will be receding from the in-focus point. Therefore, if whether the gradient is positive or negative is judged by the comparator, when it is negative if the lens driving means 23 is made to operate as it is and, when it is positive, if a reversing signal is added to the lens driving means 23, the image photographing lens 9 will always be moved toward the in-focus point. When the amplitude becomes zero, the movement of the image photographing lens 9 is stopped, and an in-focus state will be made.

Thus, the focus is detected. Acccording to the present invention, as no pupil dividing means is required, the optical system is simple and, as the light receiving element may be one of a simple structure, the signal processing system is simple and the adjustment is easy. The optical system and signal processing system are so simple that the entire formation is simple. As a result, the device of the present invention can be easily incorporated within optical instruments and medical instruments. Further, as a semiconductor position detector is used for the light receiving element, signals can be put in with the real time and, as a result, the focusing speed will increase.

Figure 8:
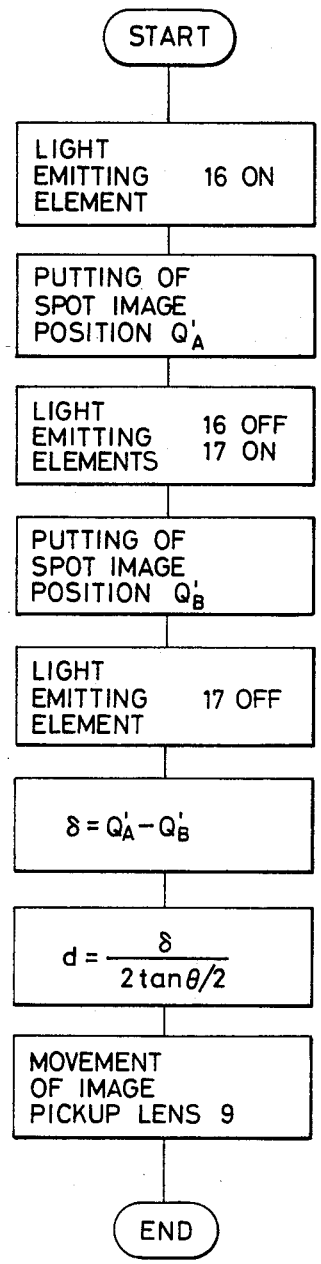
FIG. 8 is a flow shart in the case of using a microprocessor as a signal processing means.

FIG. 8 shows a flow chart in the case of using a simple micro-processor for the above mentioned controlling means 22. First, the light emitting element 16 is set ON, the spot image position $Q'_A$ at this time is put in, then the light emitting element 17 is set ON and the spot image position $Q'_B$ at this time is put in. Then, the difference (image displacement) $\delta = Q'_A - Q'_B$ is determined. The sign of $\delta$ shows the defocus direction. The absolute value of $\delta$ corresponds to the defocus amount. Next, the formula (1) is calculated, the displacement $\delta$ of the image is converted to a defocus amount and the lens 9 is moved to be able to obtain an in-focus state. At this time, in case the defocus amount d is large, the light beams from the light emitting element 16 and 17 as reflected to come back from the object will be cut by the lens frame or the like and the light amount will reduce. Therefore, in the case that the defocus amount d is large, if the light amount $(V_A + V_B)$ obtained by the light receiving element 13 is detected and the lens 9 is moved so that this value may become larger and that the light receiving element 13 can detect the position of the spot image $Q'_A$ and $Q'_B$, the focusing speed will be able to be increased. By the way, for the light emitting element 16 and 17, any of ordinary lamps, LED, lasers and semiconductor lasers may be used but practically infrared LED and infrared semiconductor lasers are preferable. For the light receiving element 13, not only a semiconductor laser but also an image sensor of a so-called CCD type or MOS type may be used.

Figure 9:
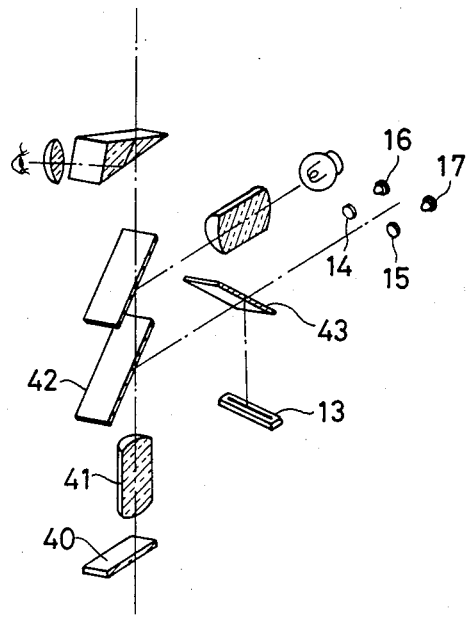
FIG. 9 is an explanatory view showing an optical system of another exbodiment of the focus detecting device accoridng to the present invention.

FIG. 9 shows an embodiment in the case that the above mentioned principle is applied to an epi-microscope. The reference numeral 40 denotes a sample placed on a stage not illustrated, 41 denotes an objective and 42 and 43 denote beam splitters. In this embodiment, the light beams emitted from the light emitting elements 16 and 17 will pass through the micro-lenses 14 and 15 and beam splitter 43 will be reflected by the beam splitter 42, will pass through the objective 41 and will reach the surface of the sample 40. Thus, the light beams from the light emitting elements 16 and 17 as reflected on the surface of the sample 40 will reach the light receiving element 13 through the objective 41 and beam splitters 42 and 43.

In this case, the signal processing system may well operate the same as the already explained processing system but driven by the lens driving means 23 is not the objective 41 but the stage mounting the sample 40. Further, if the magnification of the system including the objective 41 is $\beta$, the displacement d' of the stage will be able to be determined by $$d' = \frac{\delta}{2\beta^2 \tan\frac{\theta}{2}} \quad (6)$$

from the formula (1). By the way, in the case of the objective for microscopes, there is a lens of a type different in the chromatic aberration correcting value. Therefore, there is a difference in the focus position between the case of focusing with infrared rays and the case of focusing with visible rays but the difference varies with the type of lens. In such case, if the light emitting elements 16 and 17 are made of visible rays, there will be no problem. In this case, the optical system in FIG. 1 may be formed of off axial lights outside the visual field.

What is claimed is:

1. A focus detecting device comprising:
   image forming lens means for forming an object image;
   an image forming surface, behind said lens means;
   two light source means for producing light, respectively arranged in two optical paths different from each other both of which pass through said image forming lens means and intersect with each other in front of and behind said lens means, said behind intersect being separated from said lens means by a distance equivalent to a distance between said lens means and said image forming surface;
   means for alternately energizing said light source means to alternately project light on an object through said different optical paths;

photoelectric converting means, arranged in a position optically conjugate with said image forming surface with respect to said image forming lens means and having a single light receiving surface, for receiving the light emitted from said light source means, reflected by the object and returned through said image forming lens means, and for converting the light into a signal indicative thereof;

position detecting means, coupled to said photoelectric converting means, for calculating a position of incidence of returned light which is incident on said light receiving surface based on said indicative signal, to issue an output signal indicating the position thereof; and signal processing means coupled to said position detecting means for detecting a displacement of the object image from a predetermined image forming position on the basis of a relative position relationship between the positions of light incidence as indicated by two output signals obtained from said position detecting means.

2. A focus detecting device according to claim 1, wherein said light source means comprises a pair of light emitting elements adapted to be alternatively energized, and a pair of micro-lenses arranged between said light emitting elements and said image forming lens means.

3. A focusing detecting device according to claim 2, wherein said photoelectric converting means is a semiconductor position device having first and second output terminals which are supplied with outputs, and said position detecting means includes means for respectively determining a sum of said outputs from said first and second output terminals of said semiconductor position device and a difference of outputs thereof, and means for determining one of (a) a ratio of said difference to said sum, and (b) a ratio of said sum to said difference.

4. A focus detecting device according to claim 3, wherein said signal processing means comprises defocus direction detecting means including first means for rectifying an output signal component from said position detecting means, second means for differentiating an output signal from said means for rectifying, third means for discriminating a polarity of the output signal from said second means, and means for discriminating whether the output of said first means is zero or not.

5. A focus detecting device according to claim 2, wherein: said light emitting elements are an infrared LEDs.

6. A focus detecting device according to claim 2, wherein: said light emitting elements are an infrared semiconductor lasers.

7. A focus detecting device according to claim 1, wherein: said image forming apparatus is a camera and said objective optical system is a photographing lens of said camera.

8. A focus detecting device according to claim 1, wherein: said image forming apparatus is a microscope and said objective optical system is an objective of said microscope.

* * * * *